Aug. 6, 1929.  H. E. SIPE  1,723,308
GLASS MOUNTING AND RETAINING MEMBER
Filed Sept. 16, 1927
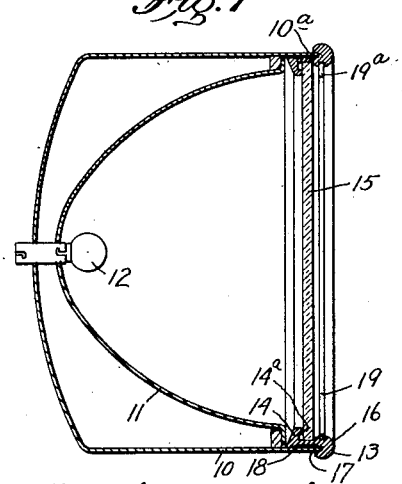
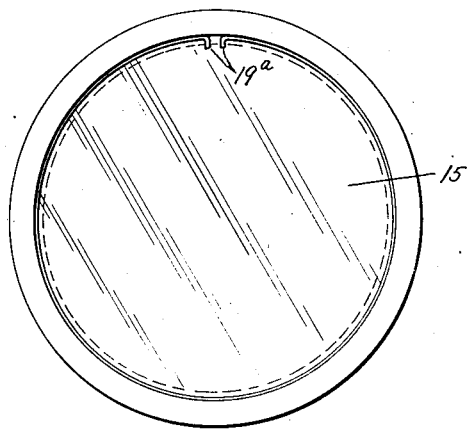
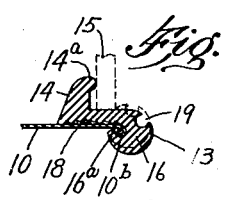
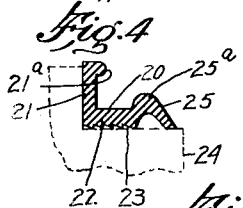
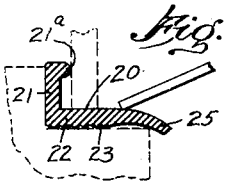
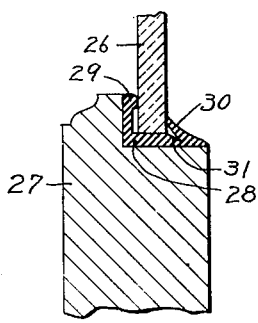
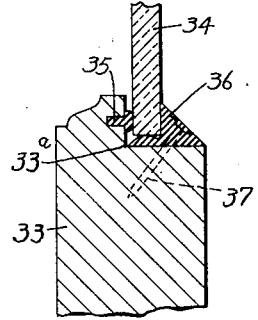
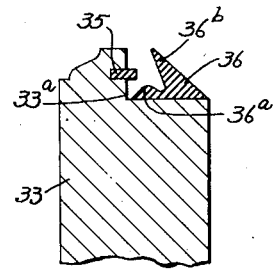
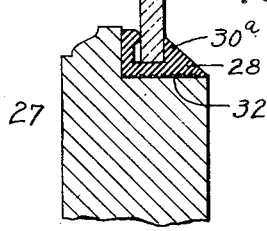
INVENTOR
Harry E. Sipe
BY
ATTORNEY Patented Aug. 6, 1929.

1,723,308

UNITED STATES PATENT OFFICE.

HARRY E. SIPE, OF NEW YORK, N. Y.

GLASS MOUNTING AND RETAINING MEMBER.

Application filed September 16, 1927. Serial No. 220,049.

This invention relates to members in the form of circular, elliptical or strip-like bodies for use in mounting and supporting lenses, plate glass, mirrors and the like in connection with suitable supports; and the object of the invention is to provide a strip or member of the class described composed of rubber or composition rubber so fashioned as to provide a resilient or cushioned mounting of a destructible glass or other panel in its support and to retain the glass within said strip or member, and providing an all rubber or cushioned mounting therefor; a further object being to provide means for permitting of the insertion and removal of a lens, panel or the like from said strip or member to permit of its attachment and detachment whenever desired; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view of a motor vehicle head light or other lamp, showing one use of my invention.

Fig. 2 is a front view of the structure shown in Fig. 1.

Fig. 3 is a sectional, detail view of the structure shown in Fig. 1 on an enlarged scale and showing a slight modification.

Fig. 4 is a view similar to Fig. 3 but showing another modified form of device.

Fig. 5 is a view similar to Fig. 4 but showing the parts in a different position.

Fig. 6 is a view similar to Fig. 4 but showing another form of device.

Fig. 7 is a view similar to Fig. 6 but showing another modification; and,

Figs. 8 and 9 are views similar to Figs. 4 and 5 but showing another modification.

My invention relates to the mounting of glass panels, lenses, mirrors and other destructible bodies in connection with a suitable support such for example, the mounting of a lens in connection with the casing or frame of a motor vehicle, head light or other lamp, the mounting of glass panels in window sash frames, doors, ventilators and other supports, and the mounting of mirrors in frames or supports of any kind or class. While I refer to glass panels, lenses and the like, it will be understood that my invention may be used in connection with the support of china or similar destructible material.

In Figs. 1 and 2 of the accompanying drawing, I have shown one use of my invention wherein 10 represents the casing of a headlight or lamp of a motor vehicle, 11 represents the reflector, and 12 the electric bulb. In practice, I mount on the free edge 10$^a$ of the casing 10, a ring like body or member 13 of rubber or composition rubber, provided on its inner side with an inwardly and radially extending flange 14 which forms a seat against which the lens 15 of the lamp is adapted to rest, the flange having a beaded portion 14$^a$ which bears upon the inner face of the lens. The outer side of the member 13 is in the form of a rim portion 16 having a recess at its outer rear side as seen at 17 to receive the inner edge 10$^a$ of the casing 10 and by means of which and the roughened surface 18 on the mmeber 13 engaging the inner wall of the casing 10, the ring member 13 is held in position.

The rim 16 extends inwardly upon the lens 15 as seen in Fig. 1 and retains the same fixedly and yet yieldably in the casing 10 of the lens, and also provides a cushioned or resilient mounting therefor. A split metallic ring 19 may also preferably be imbedded in the rim 16 to aid in retaining the lens 15 in position and to give rigidity to the structure of the rim, but expanding the split ring 19 by separating its ends 19$^a$, note Fig. 2, the rim 16 is forced forwardly in the manner seen in Fig. 3 to permit of the insertion and removal of the lens 15.

In Fig. 3 of the drawing, a slight modification is shown wherein the free edge of the casing 10 is provided with an outwardly extending body 10$^b$ which is encircled by a resilient tongue 16$^a$ on the rim 16. Otherwise, the structure shown in Fig. 3 is identical with that shown in Figs. 1 and 2. With this construction, it will be apparent that the lens 15 of a lamp of the character described or any other illuminating device or member may be supported against accidental displacement from the casing thereof by the use of my improved mounting ring or member 13. The rattling of the lens, as well as destruction thereto due to vibrations to which devices of this character are subjected, is eliminated. At the same time, a watertight and air tight connection between the lens and the casing is provided, thus protecting the reflector surface and the structure of the lamp as a whole. Further, it will be understood that the mounting ring or member may be produced in colors contrasting to or in harmony with the coloring of the lamp to give a rich and ornamental appearance thereto as will be apparent, or the strip or member may be coated with any suitable material for producing the desired color or combinations of color, and this also applies to the strip in its many uses of supporting glass panels or lights, mirrors and the like.

In Figs. 4 to 9 inclusive, I have shown other forms of mounting and retaining rims or strips for glass panels. In these figures, the strips or members are shown supported in a framework which may contitute a door and window sash frame or the like. In Figs. 4 and 5, I have shown a strip or member 20 consisting of a part 21 adapted to lie in parallel relation to one side face of the window glass or panel and having a beaded portion 21ᵃ engaging said panel and a beaded part 22 arranged at right angles to the part 21 upon which the window panel is adapted to rest and which forms a wall encircling the peripherial edge of the panel, said body being roughened on its outer surface as seen at 23 to aid in securing it to the frame or support 24. The free edge 25 of the part 22 is normally semi-circular in cross sectional form to provide a rounded rim portion 25ᵃ which cooperates with the outer side face of the window panel in retaining the same in connection with its support 24. In mounting a glass panel in connection with the member 20 or in removing a panel therefrom, the rim portion 25ᵃ may be depressed by a suitable tool as seen in Fig. 5 of the drawing to extend the same, providing a clear passage for the admission or removal of said panel. When the tool is released, the rim portion will spring back into its normal position as seen in Fig. 4 of the drawing.

In Fig. 6 of the drawing, I have shown another modification, wherein the frame or support for a glass panel 26 is shown at 27, and the mounting strip or member is indicated at 28. The strip 28 is provided with a backing flange 29 upon which one side face of the panel 26 rests and the outer end of the member 28 is provided with a flexible retaining flange 30 which is adapted to be compressed sufficiently to allow for the passage of the panel 26 thereover, and which will afterwards flex outwardly to engage the outer face of the panel to retain the same in position. This flexing may be aided by a tool placed between the panel and said flange. The flexing of the flange 30 is facilitated by a recess 31 arranged between it and the body of the member 28.

In Fig. 7 of the drawing, I have shown a slight modification of the structure shown in Fig. 6 wherein a substantially fixed but resilient flange 30ᵃ is substituted for the flange 30. In this construction, the strip may be first placed upon the periphery of the panel 26 and the panel with the strip thereon placed in the support 27 and a channellike or roughened surface 32 will be provided on the member 28 to aid in securing the same in position. At this time, attention is also directed to the fact that in the several uses of my improved device, it will be understood that the same may be tacked, glued, cemented or otherwise secured in connection with its support.

In Figs. 8 and 9, I have shown a modification wherein the support 33 is provided within the groove 33ᵃ thereof in connection with which the panel 34 is mounted, with a cushioning strip 35 adapted to be compressed as seen in Fig. 8 of the drawing in mounting the panel 34 in connection therewith, and a mounting and retaining strip 36 is provided for securing the glass panel 34 in position. The strip 36 is provided with an enlarged bearing member 36ᵃ which engages the peripherial edge of the panel 34 and forms a cushioned support therefor. A normally inclined and flexible flange 36ᵇ on the strip 36ᵃ is adapted to tensionally engage the outer face of the panel 34 to force it against the back strip 35 in the manner seen in Fig. 8 of the drawing. The strip 36 may be mounted in connection with the support 33 before mounting the panel 34 therein, and the flange 36ᵇ flexed by a suitable tool to permit of the insertion of the panel or may be placed on the edge of the panel 34, and then secured in position by the use of nails, tacks or screws 37 or in any other desired manner, it being understood that sufficient pressure is exerted upon the panel to compress the backing 35 to tensionally support the panel in connection with the support 33.

In mounting window panels in connection with doors, door frames, sky lights and the like, by the use of my improved mounting member composed of resilient or cushioning material, I obviate to a large degree, the breaking and destruction of such panels when subjected to concussions, vibrations, explosions and the like, as well as to sudden shocks, and while I have referred to a few uses of my invention, it will be understood that I am not necessarily limited to these specific uses, nor to the mounting of glassware, chinaware or the like of any particular character, and other changes in and modifications of the construction herein shown and described, may be made within the scope of the appended claims without departing from the spirit of my invention or sacrificing its advantages.

Having fully described my invention, what I claim as new and desire to secure by Letters Patent, is:—

1. A mounting body of resilient material provided with means for retaining said body in connection with a mounting member, means on said body for receiving the device to be mounted and for retaining said device in said body and member by the compression of the material of said body, said body including a metallic element which aids in retaining the device therein.

2. A mounting body of resilient material provided with means for retaining said body in connection with a mounting member, means on said body for receiving the device to be mounted and for retaining said device in said body and member by the compression of the material of said body, said body including a metallic element which aids in retaining the device therein, and said metallic element being adapted to be flexed to expand said body to permit of the insertion and removal of said device.

3. A panel and lens mounting device comprising a strip of yielding and cushioning material, said strip having a portion engaging the peripherial edge of said panel, a part engaging one side face of the panel adjacent the periphery thereof, means for securing said strip to a support in connection with which the panel is to be mounted, a resilient member engaging the opposite side face of the panel to provide an all cushioned mounting for said panel, said last named member being integral with said strip, and said strip including a metallic element which aids in securing the panel in connection therewith.

4. A panel mounting member of the class described, comprising an annular body of elastic material, said body having a continuous channel directed inwardly and radially, in which the peripherial portion of the panel to be mounted is adapted to be placed, said panel being retained in said member under the compression of one side wall of the channel of said member, and means whereby said side wall may be flexed to permit of the insertion and removal of said panel.

5. A panel mounting member of the class described, comprising an annular body of elastic material, said body having a continuous channel directed inwardly and radially, in which the peripherial portion of the panel to be mounted is adapted to be placed, said panel being retained in said member under the compression of one side wall of the channel of said member, means whereby said side wall may be flexed to permit of the insertion and removal of said panel, and means for retaining said member in connection with a support.

6. A resilient mounting of the class described formed with two continuous grooves having two independent channel portions, one of said channel portions being adapted to receive the peripherial edge of a panel to be mounted, and the other channel being adapted to receive a support in connection with which said panel is mounted.

7. A resilient mounting of the class described formed with two continuous grooves having two independent channel portions, one of said channel portions being adapted to receive the peripherial edge of a panel to be mounted, the other channel being adapted to receive a support in connection with which said panel is mounted, and at least one wall of each channel being placed under compression in securing the panel and support thereto and in coupling the same together.

8. A mounting strip of the class described comprising an elastic body having two independent and angularly disposed channel portions arranged longitudinally thereof.

9. A mounting strip of the class described comprising a body of elastic material, substantially U-shaped in cross sectional form, one side wall of said body being of greater transverse dimensions than the other side wall, and said other side wall having an inclined outer surface over which a member to be placed in said body and between the side walls thereof, is adapted to be passed.

10. A mounting strip of the class described comprising a body of elastic material, substantially U-shaped in cross sectional form, one side wall of said body being of greater transverse dimensions than the other side wall, said other side wall having an inclined outer surface over which a member to be placed in said body and between the side walls thereof, is adapted to be passed, and said second named side wall being placed under compression in engaging said member.

11. A mounting strip of the class described comprising a body of elastic material, substantially U-shaped in cross sectional form, one side wall of said body being of greater transverse dimensions than the other side wall, said other side wall having an inclined outer surface over which a member to be placed in said body and between the side walls thereof, is adapted to be passed, said second named side wall being placed under compression in engaging said member, and the first named side wall having at its free edge an inwardly projecting enlargement adapted to engage the adjacent surface of the member mounted in said body.

12. A mounting strip of the class described comprising a body of elastic material, substantially U-shaped in cross sectional form, one side wall of said body being of greater transverse dimensions than the other side wall, said other side wall having an inclined outer surface over which a member to be placed in said body and between the side walls thereof, is adapted to be passed, said second named side wall being placed under compression in engaging said member, the first named side wall having at its free edge an inwardly projecting enlargement adapted to engage the adjacent surface of the member mounted in said body, and means for retaining said strip in connection with a suitable support.

In testimony that I claim the foregoing as my invention I have signed my name this 9th day of Sept., 1927.

HARRY E. SIPE.